United States Patent Office 3,498,769
Patented Mar. 3, 1970

3,498,769
FUSED ZIRCONIA-SPINEL ABRASIVES AND ARTICLES MADE THEREWITH
Loring Coes, Jr., Princeton, Mass., assignor to Norton Company, Worcester, Mass., a corporation of Massachusetts
No Drawing. Filed Jan. 16, 1969, Ser. No. 791,804
Int. Cl. C08h 17/12
U.S. Cl. 51—298        6 Claims

ABSTRACT OF THE DISCLOSURE

The invention is a series of novel, fused abrasive compositions which are made up essentially of spinel and zirconia, and which possess the ability to remove metal at the high rate of the most superior alumina abrasives but with the wear-resistance of the newer zirconia-alumina abrasives. Mixtures of certain proportions of alumina, magnesia and zirconia are fused to a molten mass, and then cooled, preferably by casting the molten mass into small molds. This produces an intimate frozen mixture of zirconia and spinel crystals which is then comminuted to appropriate grain (granule) sizes, for use in grinding wheels, coated abrasive products and the like.

BACKGROUND OF THE INVENTION

The invention relates to fused abrasives. More particularly it relates to fused, cast, crystalline zirconia type abrasives. This abrasive type usually possesses high impact strength and results in grinding wheels of great durability, ideally suited for such heavy duty grinding operations as so called snagging.

For many years fused alpha aluminum oxide has been the abrasive industry's major contribution to the metalworking art for heavy duty grinding operations such as those called snag grinding. The success of alpha-aluminum oxide abrasives is attributable to the material's inherent hardness, high melting point, and relative chemical inertness towards metals. When such abrasives are used in a grinding wheel, the resultant wheel is a highly efficient one, with the capability of removing relatively large quantities of metal for relatively low cost in terms of wheel wear. The presently used, highly efficient alpha-alumina abrasives are the result of many years of effort on the part of the abrasive industry to improve upon the original members of the species. The major improvements have resulted from the acquired ability to closely control the chemistry of the abrasives, the discovery that abrasives of improved strength resulted when the fused alumina was cooled rapidly, the innovation of mulling the abrasive grain to a blockier or stronger shape, and the evolution of the concept of heat treating abrasive grains to anneal out thermal stresses and strains.

More recently an abrasive even more efficient than the alpha-alumina type for heavy duty or rough grinding, was introduced. This family of abrasives is made up essentially of alpha-alumina and zirconia. The introduction of the zirconia into the alpha-alumina composition offsets the one major weakness of the latter material, which is its relatively high wear rate. The alpha-alumina zirconia abrasives are superior in grinding efficiency to the essentially alumina abrasives by way of a very significant improvement in the abrasive's durability. The $Al_2O_3$—$ZrO_2$ abrasives, under a given set of grinding conditions, remove metal at a somewhat lower rate than the aluminous abrasives, however, the former abrasives exhibit wheel wear rates as much as 50% less, which more than offsets the lower metal removal rate. The impressive performance of the $Al_2O_3$—$ZrO_2$ abrasives can be readily appreciated by a review of U.S. Letters Patent No. 3,181,939.

However, despite the major impact made on the metalworking industry by the introduction of fused alpha-alumina abrasives and the very significant cost improvement resulting from the more durable alpha-alumina-zirconia abrasive, they both fall short of ideal in grinding applications where labor or time is the more critical economic factor rather than abrasive or wheel costs. In grinding applications where the cost of labor is paramount, the most important property of an abrasive is its rate of cut or its rate of metal removal under a given set of grinding conditions. In view of the skyrocketing costs of labor in recent years, the metalworking industry has developed a dire need for an abrasive which would substantially decrease the amount of labor which must be expended on certain metal conditioning operations. An abrasive with a substantially increased rate of cut or rate of metal removal, with no significant loss in abrasive durability, would necessarily then affect a substantial cost saving; this invention provides the metalworking industry with just such an abrasive.

SUMMARY OF THE INVENTION

Briefly, this invention is a fused, high strength, rapidly cutting, crystalline abrasive which is composed essentially of zirconium oxide and spinel. In the practice of this invention a conventional electric arc fusion furnace is charged with, for example, the proper quantities of bauxite ore, zirconium oxide, magnesium oxide, coal and iron borings. The mixture is fused, and then cast into ingots where the mixture freezes rapidly. The frozen mixture consists then essentially of crystalline zirconia and magnesium oxide-aluminum oxide spinel. When the abrasive resulting from this frozen mixture of zirconia and spinel is utilized in a grinding wheel, and the wheel evaluated grinding low alloy steel, the grinding results show the zirconia-spinel abrasive to possess the high rate of metal removal of the more conventional straight alumina abrasives and the exceptional durability (wear resistance) of the alumina-zirconia abrasives.

This unique zirconia-spinel abrasive provides the metalworking industry with the heretofore unattainable combination of high rate of metal removal and low wheel wear. The invention fills that gap left by the rapidly cutting but rapidly wearing straight alumina abrasives, and, the exceptionally durable but relatively slower cutting zirconia-alumina abrasive.

It is therefore an object of this invention to provide the metalworking industry with an abrasive equal in durability to the best abrasive currently available, but with the capability of removing metal at a substantially faster rate.

It is another object of this invention to provide an abrasive ideally suited for heavy duty grinding.

It is still another object of this invention to provide an abrasive with economic advantages over current abrasives for grinding operations involving a substantial amount of labor.

It is a further object of this invention to provide grinding wheels made with an abrasive particularly advantageous for grinding operations such as floor stand snagging and swing frame snagging.

It is yet a further object of the invention to provide an abrasive, which by virtue of its ability to remove metal at a high rate, is suitable for coated abrasive products.

Still further objects will become apparent to those skilled in the abrasive and metalworking arts as the detailed description of the invention is presented hereinafter.

DESCRIPTION OF THE PREFERRED EMBODIMENTS

The spinels are a family of inorganic compounds having the generic formula $M^{II}(M^{III}O_2)_2$ and characterized by a particular crystal structure in which the oxygen atoms are arranged in a cubic close-packed fashion, with $M^{III}$ (trivalent metal) atoms occupying octahedral holes and atoms of $M^{II}$ (a divalent metal) tetrahedral holes. The spinel structure and generic formula are characteristic of a variety of natural and synthetic compounds in which $M^{II}$ can be beryllium, magnesium, zinc, cadmium, manganese, iron, cobalt, or nickel; $M^{III}$ can be aluminum, gallium, indium, iron, cobalt, or chromium. The term "spinel" has come to be more or less reserved for the magnesia-alumina member of the family having the formula $Mg(AlO_2)_2$. Hereinafter, the term "spinel" means the magnesia-alumina species and the term "spinels" refers to the entire genus. The situation becomes more complex when consideration is given to the fact that the magnesia-alumina spinels exist which contain more alumina than is present in the simple spinel $Mg(AlO_2)_2$ or written another way, $MgO \cdot Al_2O_3$; for example, $MgO \cdot 4Al_2O_3$. In the latter compound, the 3 alumina molecules in excess of the one required to form the simple $Mg(AlO_2)_2$, are considered to be in solid solution with the spinel $$Mg(AlO_2)_2$$

Such high alumina containing spinels are commonly referred to as "magnesia deficient." Because the practice of this invention includes $Al_2O_3$ to $MgO$ ratios greater than 4 to 1, and further, because it appears to be immaterial whether the excess alumina is dissolved in the spinel or not, that alumina in excess of that prescribed by the formula $Mg(AlO_2)_2$, is hereinafter called "non-spinel" alumina. The same term is applied to those embodiments of the invention, wherein there is an excess of magnesia over the formula $Mg(AlO_2)_2$; this excess magnesia is called "non-spinel" magnesia regardless of whether it is dissolved in the $Mg(AlO_2)_2$ or not.

In an attempt to synthesize an abrasive with the metal removal characteristics of the old standby aluminum oxide, and the durability characteristics of the newer zirconia-alumina abrasive, numerous inorganic materials and combinations of these were studied. During this investigation it was discovered that incorporation of magnesia-alumina spinel into a zirconia matrix, resulted in a particulate abrasive material that satisfied the objective, and that this would be true with as little as 15% by weight of spinel.

More specifically, it was found that such a particulate abrasive resulted when mixtures of about 20–65% by weight of zirconium oxide and about 35–80% by weight of a mixture of magnesium oxide and aluminum oxide, was fused in a conventional electric arc tapping furnace, and the fused mixture rapidly cooled by casting into small ingots or slabs. Furthermore, it was found that the spinel portion of this composition need not be strictly a 1 to 1 molar ratio of aluminum oxide to magnesium oxide, but that a superior particulate abrasive resulted if the abrasive composition contained excess non-spinel aluminum oxide or magnesium oxide within certain limits.

During the course of the investigation which led to the novel zirconia-spinel abrasive particles of this invention, a number of spinels other than the magnesia-alumina member of the family, were considered. It was believed that the other spinels would result in brasives inferior to the magnesia-alumina spinel combined with the zirconia. The other spinels would fail where the magnesia-alumina spinel succeeded because the former materials have melting points significantly below 2000° C. while the latter has a melting point of 2135° C. It is accordingly theorized that all other factors being approximately equal, the material with the highest melting point results in the abrasive of highest quality.

In the ideal practive of this invention very high purity alumina, zirconia, and magnesia would be used. However, because of the high cost of such high purity materials their use would be impractical. The invention can be successfully practiced using such relatively impure raw materials as bauxite, magnesite, and zircon sand. The level of impurities introduced by the utility of such relatively impure materials, must be given some consideration, however. Although a total impurity content in excess of 5% in the finished zirconia-spinel abrasive, is not fatal to the superior grinding performance of such an abrasive, it is more desirable to limit the amount of impurities to about 5% or less. For this reason it is desirable to select a combination of alumina, zirconia, and magnesia containing materials or carry out the fusion such that the total impurity content in the finished abrasive product, will not exceed about 5%. The optimum composition of the finished product is that of the eutectic or zirconia and spinel, which is about 52% by weight of zirconia and about 48% by weight of spinel, with the spinel being made up of a 1:1 molar ratio of alumina to magnesia so that there is no non-spinel alumina or magnesia. Fortunately, because such an ideal composition would be difficult to achieve on a production basis, the present invention is not dependent on such a limitation. It has been found that the superior abrasive of the invention is accomplished when as much as 7% by weight of the total composition, is present as non-spinel magnesium oxide. Furthermore, the system can tolerate as much as 65% by weight of the total composition as non-spinel aluminum oxide. As stated earlier, the non-spinel MgO or $Al_2O_3$ can be present in solid solution in the spinel or not part of the spinel structure at all. The optimum compositional range then, is an approximate 1:1 weight ratio of zirconia to spinel wherein the zirconia and spinel are each present in the amount of 35–55% by weight.

The particular fusion process used here is of no consequence. It is only necessary that the apparatus or equipment used be capable of fusing the mixture of zirconia, alumina, and magnesia containing materials. An ideally suited arc-tapping furnace is described in U.S. Patent No. 2,426,643 to Ridgway.

Once the fusion is complete, that is fusion has occurred and all the necessary reactions have gone to completion, the fused mass is preferably cast into ingots or slabs and allowed to cool. Both the rate of cooling of the molten fused mass and its composition exert an influence on the numerical average crystal size of the final product. Within the composition ranges disclosed herein where the molar ratio of $Al_2O_3$ to $MgO$ is 1:1, there is always present in the solidified product, a substantial amount of zirconia-spinel eutectic. This is always extremely fine in crystal size, being of the order of 5 microns or less, and appears to be substantially independent of the cooling rate. If the composition of the material is the eutectic composition, i.e. about 52% by weight of $ZrO_2$ and 48% spinel, then the entire composition has a very small numerical average crystal size.

On the other hand, if the composition deviates significantly from that of the eutectic, e.g. 28% $ZrO_2$, and 62% spinel, the approximate 30% spinel in excess of the eutectic composition will form much larger crystals upon freezing of the molten mass than will the eutectic portion, for any given rate of cooling.

The third compositional combination that contributes to the crystalline character of this novel abrasive is that containing non-spinel MgO, or $Al_2O_3$ in excess of the stoichiometric quantities needed to form the spinel. Whether the non-spinel MgO or $Al_2O_3$ is in solid solution or precipitated out, within the quantity limitations of the invention, it is present in an extremely finely crystalline state, like that of the $ZrO_2$-spinel eutectic, and furthermore, the eutectic formed by $ZrO_2$ and these MgO or $Al_2O_3$ rich spinels is as finely crystalline as the simpler 1:1 $MgO \cdot Al_2O_3$ and $ZrO_2$ eutectic mentioned above.

The numerical average crystal size of both the $ZrO_2$-spinel (which may contain dissolved non-spinel $Al_2O_3$ or MgO) and the undissolved $Al_2O_3$ or MgO species are inherently controlled at about 5–10$\mu$ or less by the compositions disclosed herein and are relatively uneffected by the processing conditions.

When the composition in point is one which contains an excess of spinel over that required to satisfy the $ZrO_2$-spinel eutectic then the cooling rate can exert a significant influence on the final product. In this case the greater the excess of spinel and the slower the cooling rate of the molten mass, the larger will be the crystal size of these primary crystals of spinel.

The only limitation on the size of the primary spinel crystals, and therefore on the cooling rate of the molten mass, is that imposed by the intended particle or grit size of the finished abrasive. The amount of excess spinel and the cooling rate must not be such that the resultant crystals of primary spinel are so large that when the crude abrasive is comminuted to the desired grit size, that the composition of a substantial portion of the comminuted abrasive falls outside of the $ZrO_2$-spinel compositional parameters of the invention. For example, if a final finished abrasive product with a grit size of 70 (U.S. Standard Sieve Sizes) is made from a crude abrasive which has a composition of 28% $ZrO_2$, 62% spinel, 6% excess $Al_2O_3$, and 4% impurities, and which had been cast in the molten state into 50 pound ingot molds, about 26% of the 70 grit abrasive particles would be essentially spinel and not the $ZrO_2$-spinel composition of the invention because this crude-abrasive composition and the cooling rate resulting from casting in a 50 pound mold, would result in primary spinel crystals with an average crystal size of about 210 microns which is about equal to 70 grit.

It should be understood that the foregoing discussion, applies equally to $ZrO_2$-spinel compositions containing dissolved and/or undissolved non-spinel $Al_2O_3$ or MgO.

Conversely, if the same crude abrasive, described above, was comminuted to 14 grit (U.S. Standard Sieve Sizes) abrasive which is about 1410 microns in size then this abrasive grit would fall within the particulate abrasive material, or abrasive grit compositional range disclosed herein.

In other words, the numerical average crystal size of the abrasive of this invention is not a limiting factor, except as it affects the composition of the final particulate abrasive material. The average crystal size should be such as to result in comminuted abrasive particles, at least the major portion by volume of which fall within the compositional parameters, set forth in the appended claims.

The final step of abrasive granule preparation is that of comminution. There are, well known and available, many methods of comminution of crude abrasive; among these are jaw crushing, hammer milling, rolls crushing, impact crushing, and so on. The mode of comminution is not a prime factor in the invention. However, it is preferred for economic reasons, to use an impact crushing technique such as hammer-milling or that described in the German Patent No. 506,517 dated Dec. 1, 1928. Additionally, if the abrasive being prepared is intended for heavy duty snagging, the impact crushing method of comminution provides an abrasive more ideally suited for this grinding operation, by virtue of impact crushings inherent ability to allow only the strongest grains to survive the crushing process.

To those skilled in the art, it is well known that after the crude abrasive has been comminuted and screened to desirable sizes, there are additional processing steps available to further treat the thusly prepared grain, such as those mentioned above, i.e. the finished abrasive grain can be heat treated and/or it can be mulled or panned to so-called stronger shape. The novel abrasive compositions of this invention are also amenable to such further treatments.

The unique abrasive composition of this invention, though ideally suited for heavy duty grinding operations like snagging, are not limited in utility to this specific type of grinding operation. They will function well in any grinding operation where conventional aluminum oxide abrasives have been used in the past, e.g. in precision grinding operations like roll grinding, centerless grinding, crankshaft grinding, in coated abrasive applications, and so on; the abrasive used in these grinding operations differs from that used in rough grinding primarily in the grit size that must be employed, and to some degree, the shape of the grain particles.

It will become immediately apparent to one skilled in the grinding wheel art, and these zirconia-spinel abrasives, including those containing dissolved or undissolved non-spinel $Al_2O_3$ or MgO, can be formed into a grinding wheel with the use of any one of the three, well known, major grinding wheel bonding agents or materials which are the clay based or vitrified bonds, the silicate of soda bonds, and the resinoid or organic bonds which include thermosetting resins like the condensation product of phenol and formaldehyde, epoxy resins, alkyd resins, polyurethanes, unsaturated polyesters, shellac, vulcanized rubber, and the like. The field of grinding wheel bond technology is vast and is not relevant to the instant invention, therefore no further discussion of this subject is required here.

A number of detailed examples of the practice of this invention are presented forthwith. It will be noted that in all of the examples cited, the type of grinding wheel used to evaluate the various zirconia-spinel-MgO-$Al_2O_3$ compositions, is in each case a resinoid bonded grinding wheel werein the binder is made up of a phenol-formaldehyde condensation polymer. Furthermore, it will also be noted that the various invention abrasives were all evaluated in so-called rough grinding or snagging operations. This arbitrary selection should not be construed in any sense as limiting; the invention abrasive, because of its ability to remove metal at a very high rate, is also well suited for precision grinding.

In the following examples, the quality or performance of the various abraisives is expressed as the G-ratio which is the ratio of metal removed in pounds/hr. to the wheel wear rate in cubic inches per hour.

Furthermore, in the ensuing examples, the essentially alumina abrasive and the alumina-zirconia abrasive were processed in the manner known to produce abrasives with optimum properties for snagging, i.e. the abrasives were comminuted and then dry panned (mulled) to a strong, blocky shape. The invention abrasives were not mulled however, so that the grinding results, using these abrasives, are somewhat inferior to what they would be if the abrasives had been mulled.

Example A

A small electric-arc tapping furnace, with a capacity of about 1000 pounds, was fed with a mixture comprised of 47 pounds of Surinam bauxite ore, 49.5 pounds of zirconium oxide containing about 5% silica and about 10% aluminum oxide, 20 pounds of magnesium oxide, 3.5 pounds of barley coal, and 5 pounds of iron borings per 100 pounds of mix. This raw batch mixture was fused and maintained in the molten state for a time sufficient to allow the normal chemical reactions to take place, the total time being 6.25 hours. The molten product was then cast into tapered iron ingot molds with a capacity of about 50 pounds; the molten mass solidified rapidly. The solid product had the following weight percent composition:

| | |
|---|---|
| $SiO_2$ | 1.29 |
| $Fe_2O_3$ | 0.11 |
| $TiO_2$ | 1.83 |
| $Al_2O_3$ | 6.80 |
| Spinel | 46.96 |
| $ZrO_2$ | 43.01 |

The crude abrasive ingots were then rough crushed until the material would pass through a screen with ⅜" openings but would be contained on an 18 mesh screen; the coarsely particulate material was then impact crushed to produce a high yield of abrasive granules that would pass through a 10 mesh screen, but would be retained on an 18 mesh screen.

The through 10 and on 18 mesh zirconia-spinel A abrasive was then evaluated in a comparative grinding test with the highly regarded fused alumina-zirconia abrasive of U.S. Patent 3,181,939 and against the more conventional 95% alumina abrasive, these identified by the Norton Company as 68 ALUNDUM and 44 ALUNDUM respectively. The wheels used in the test were the hot-pressed organic or resinoid bonded type.

The wheels were made by first placing in a mixing apparatus, prescribed amounts of abrasive and a conventional bond, the bond being made up of a two-stage phenol-formaldehyde resin, potassium fluoroborate, iron pyrites, and calcium oxide. After thoroughly mixing these ingredients a predetermined amount of the mixture was placed in a steel mold with an inside diameter of approximately 16" and containing a steel bottom plate and steel arbor. The top plate of the mold was then set in place and the mold assembly placed in a hot press were a pressure of about 2 tons per sq. inch was applied to the mold at a temperature of about 160° C. The temperature and pressure conditions were maintained on the mold for a period of about 1 hour, resulting in a compressed product about 2" thick and containing about 1% porosity. The partially cured wheel contained in the mold was then removed from the hot press and stripped from the mold, and placed in a circulating air oven where it was subjected to a heat treatment of about 180° C. for 12 hours. The final wheel fabricating steps were those of truing, siding and reaming of the hole in order to provide a wheel that was well balanced and runnig true. All three wheels, i.e. wheels containing the zirconia-alumina, the straight alumina, and the novel zirconia-spinel abrasive, were fabricated in an identical manner. The three wheels were then tested on a hydraulic billet grinding machine, with the wheel rotating at 9,500 s.f.p.m., and a downward force being exerted betwen the wheel and the workpiece of 400 pounds. The material ground was 4140 low alloy steel.

The results of this comparative grinding test are contained in Table I.

TABLE I

| Abrasive | Wheel wear | Material removal | G-Ratio |
| --- | --- | --- | --- |
| 44 ALUNDUM (95% alumina) | 97.7 | 117 | 1.2 |
| Zirconia-Alumina (40% $ZrO_2$) | 30.8 | 86.5 | 2.8 |
| Zirconia-Spinel A | 34.5 | 133 | 3.9 |

Ww=cubic inches per hour.
MR=pounds per hour.
G-Ratio=MR/Ww.

The superiority of the zirconia-spinel-A abrasive is apparent from the tabulated data. The abrasive of this invention removes metal at a rate actually exceeding that of the very rapidly cutting 95% alumina abrasive, while exhibiting a degree of durability far superior than the alumina abrasive and about comparable to the zirconia-alumina abrasive. Because of the ability of the zirconia-spinel abrasives to remove metal at a very high rate, the amount of grinding time, e.g. to descale a billet, and therefore the amount of labor that must be expended, is decreased. The low wheel wear rate (high degree of durability) of this abrasive results in relatively low wheel cost for removal of any given amount of metal. The G-ratio number is a convenient measure of the quality of the abrasive, the higher the G-ratio number the higher the quality of a given abrasive, and in a sense, the G-ratio combines the effects of material removal and wheel wear rates. The G-ratio in this instance shows the zirconia-spinel abrasive to be more than 200% superior to the 95% alumina material and about 36% superior to the newer zirconia-alumina abrasive.

Example B

A finished through 10 on 18 mesh zirconia-alumina abrasive was prepared in a manner identical to that described in Example A except that the raw batch fed to the furnace comprised 45 pounds of Surinam bauxite ore, 58 pounds of zirconium oxide containing 5% silica and about 10% alumina, 12 pounds of magnesium oxide, 3.4 pounds of barley coal, and 5.5 pounds of iron borings per 100 pounds of mix, and the total heating time in the furnace was 11.75 hours. This finished abrasive product had the following weight percent composition:

$SiO_2$ ------ 1.35
$Fe_2O_3$ ------ 0.13
$TiO_2$ ------ 1.62
$Al_2O_3$ ------ 16.32
Spinel ------ 33.60
$ZrO_2$ ------ 46.98

The abrasive was used to make a hot-pressed organic bonded wheel identical in specification and dimensions to that described in Example A. The wheel was then evaluated in a grinding test identical to that described in Example A and compared against the particular zirconia-alumina and the fused 95% alumina containing wheels of Example A, with the following results:

TABLE II

| Abrasive | Wheel wear | Material removal | G-Ratio |
| --- | --- | --- | --- |
| 44 ALUNDUM (95% alumina) | 97.7 | 117 | 1.2 |
| Zirconia-Alumina (40% $ZrO_2$) | 30.8 | 86.5 | 2.8 |
| Zirconia-Spinel B | 38.2 | 123 | 3.2 |

Wheel wear=cubic inches per hour.
Material removal=pounds per hour.
G-Ratio=MR/Ww.

This zirconia-spinel B composition also exhibits the high metal removal rates of the 95% aluminous type abrasives and the approximate durability of the zirconia-alumina type.

Example C

The abrasive and grinding wheel of this example were prepared in the identical manner as were those of Examples A and B with the exception that the raw batch fed into the furnace initially was composed of 58 pounds of Surinam bauxite ore, 49 pounds of zirconium oxide containing about 5% $SiO_2$ and about 10% $Al_2O_3$, 18 pounds of magnesium oxide, 4 pounds of barley coal, and 5 pounds of iron borings per 100 pounds of mix, the total heating time in the furnace was 7.5 hours, and the molten mix was cast into a slab instead of an ingot. This furnace composition resulted in a finished abrasive with the following weight percent analysis:

$SiO_2$ ------ 1.29
$Fe_2O_3$ ------ 0.19
$TiO_2$ ------ 1.62
$Al_2O_3$ ------ 18.57
Spinel ------ 41.81
$ZrO_2$ ------ 36.52

The abrasive was evaluated in a grinding test against the zirconia-alumina and 95% alumina abrasives of the foregoing examples with the following results:

TABLE III

| Abrasive | Wheel wear | Material removal | G-Ratio |
| --- | --- | --- | --- |
| 44 ALUNDUM (95% alumina) | 97.7 | 117 | 1.2 |
| Zirconia-Alumina (40% $ZrO_2$) | 30.8 | 86.5 | 2.8 |
| Zirconia-Spinel C | 43.2 | 128 | 2.96 |

Wheel wear=cubic inches per hour.
Material removal=pounds per hour.
G-Ratio=MR/Ww.

This zirconia-spinel C composition which contains almost 20% of $Al_2O_3$ in excess of that required to form the spinel, removes metal at the very rapid rate of 128 pounds per hour. The wheel wear rate however is now significantly higher than that of the durable zirconia-alumina material, but the resultant G-ratio is still excellent.

Example D

The zirconia-spinel abrasive and the wheel made therewith were fabricated in an identical manner to those zirconia-spinel abrasives of the foregoing examples with the exception that in this case the raw batch fed into the furnace was made up of 68 pounds of Surinam bauxite ore, 24 pounds of zirconium oxide containing about 5% $SiO_2$ and about 10% $Al_2O_3$, 25 pounds of magnesium oxide, 4.2 pounds of barley coal, and 2 pounds of iron borings per 100 pounds of mix, and the total heating time in the furnace was 6.75 hours. The resulting finished abrasive had the following chemical analysis:

| | |
|---|---|
| $SiO_2$ | 1.70 |
| $Fe_2O_3$ | 0.94 |
| $TiO_2$ | 1.86 |
| $Al_2O_3$ | 2.77 |
| Spinel | 71.55 |
| $ZrO_2$ | 21.18 |

The wheel containing this abrasive was compared in a grinding test in an identical manner and against the identical wheels of Examples A, B, and C, with the following results:

TABLE IV

| Abrasive | Wheel wear | Material removal | G-Ratio |
|---|---|---|---|
| 44 ALUNDUM (95% alumina) | 97.7 | 117 | 1.2 |
| Zirconia-Alumina (40% $ZrO_2$) | 30.8 | 86.5 | 2.8 |
| Zirconia-Spinel D | 68.0 | 107 | 1.6 |

Wheel wear=cubic inches per hour.
Material removal=pounds per hour.
G-Ratio=MR/Ww.

The zirconia-spinel D abrasive, despite the fact that it contains only 21.18 percent $ZrO_2$, possesses the ability to remove metal at the rate of 107 pounds per hour. The durability or wheel life is, however, now somewhere about midway between that of the zirconia-alumina and the 95% alumina abrasives.

Example E

The zirconia-spinel abrasive of this example and the grinding wheel made for testing were prepared in the identical manner as those of all the foregoing examples with the exception that the raw batch composition which went into the furnace was made up of 46 pounds of Surinam bauxite ore, 49 pounds of zirconium oxide containing about 5% $SiO_2$ and about 10% $Al_2O_3$, 32.4 pounds of magnesium oxide, 4 pounds of iron borings, and 3.9 pounds of barley coal per 100 pounds of mix, and the total heating time in the furnace was 6.42 hours, which produced a finished abrasive with the following chemical analysis:

| | |
|---|---|
| $SiO_2$ | 1.90 |
| $Fe_2O_3$ | 0.37 |
| $TiO_2$ | 1.52 |
| CaO | 0.14 |
| MgO | 7.63 |
| Spinel | 53.23 |
| $ZrO_2$ | 35.21 |

This wheel was evaluated in an identical manner and against the identical zirconia-alumina and 95% alumina wheels of the foregoing examples with the following results:

TABLE V

| Abrasive | Wheel wear | Material removal | G-Ratio |
|---|---|---|---|
| 44 ALUNDUM (95% alumina) | 97.7 | 117 | 1.2 |
| Zirconia-Alumina (40% $ZrO_2$) | 30.8 | 86.5 | 2.8 |
| Zirconia-Spinel E | 135 | 118 | 0.87 |

Wheel wear=cubic inches per hour.
Material removal=pounds per hour.
G-ratio=MR/Ww.

This zirconia-spinel E abrasive, which interestingly contains 7.68% excess MgO, exhibits a high material removal rate, but the wheel wear rate now exceeds that of the 95% alumina abrasive.

Example F

The zirconia-spinel abrasive of this example was made essentially in the same manner as the abrasives of the preceding examples except that the raw batch mixture fed into the furnace initially was of such a composition as to result in a finished abrasive with the following weight percent analysis:

| | |
|---|---|
| $SiO_2$ | 0.04 |
| $Fe_2O_3$ | 0.10 |
| $TiO_2$ | 0.30 |
| Spinel | 34.96 |
| $ZrO_2$ | 64.62 |

This abrasive was comminuted to a grit size that would pass through a 14 mesh screen, but would be retained on a 24 mesh screen, and utilized in a hot-pressed resinoid wheel of a type similar to those wheels used in the above examples. A wheel of the same type was made with a 95% alumina abrasive. These wheels were evaluated hand swing frame snagging 302 stainless steel, at 9500 s.f.p.m. and under a grinding force of 150 pounds. The comparative grinding results were as follows:

TABLE VI

| Abrasive | Wheel wear | Material removal | G-Ratio |
|---|---|---|---|
| 95% Alumina | 11.4 | 16.8 | 1.48 |
| Zirconia-Spinel F | 5.1 | 14.9 | 2.92 |

Wheel wear=cubic inches per hour.
Material removal=pounds per hour.
G-Ratio=MR/Ww.

This zirconia-spinel F composition exhibits the desirable high rate of metal removal with about twice the durability of the 95% alumina material. Further, this abrasive contains no excess MgO or excess $Al_2O_3$. This material was predominantly made up of the finely crystalline eutectic of $ZrO_2$ and spinel which is about 52% $ZrO_2$ and 48% spinel, by weight.

Example G

A coated abrasive product is fabricated in the following manner:

A drills cloth 38½" wide, weighing 2.14 yards per pound and having a 14's warp and a 12's fill yarn and a count of 72 x 48, is desized and combined by way of an adhesive, with a suitable grade of vulcanized fiber like what is known as 10 mil vulcanized fiber of abrasive grade. An excellent adhesive for preparing this backing material is:

30.9 pounds of 86 millipoise hide glue
41.8 pounds of finely ground (about 15μ) calcium carbonate
27.3 pounds of water.

The adhesive is applied to the fiber and the cloth is combined therewith in the conventional manner; application of the adhesive is best done at about 77° C. The web so assembled is then dried and bundled in the usual manner.

To the cloth side of the backing so prepared is applied a thin coating of sizing adhesive consisting of 25.4 pounds of 86 millipoise hide glue, 25.4 pounds of finely particulate (about 15μ) calcium carbonate, and 49.2 pounds of water, in a coating of a thickness such as to result in a dried sizing adhesive weight of 2.2 pounds per coated abrasive (sandpaper) ream.

On the lightly sized side of the backing is applied a making coat consisting of 30.4 pounds of 86 millipoise hide glue, 30.4 pounds of fine (15μ) calcium carbonate and 39.2 pounds of water which has been mixed and cooled and finally brought to a temperature of about 71° C. This application is accomplished using a conventional sandpaper machine applying a quantity of the aforementioned composition sufficient to result in a wet weight of 15.0 pounds per ream. An amount of 24 grit abrasive like that of Example A is applied to the making coat equivalent to approximately 46 pounds per coated abrasive (sandpaper) ream. This combination is then dried to set the making coat.

The drying step is then followed by the application of the final sizing coat which comprises 32 pounds of a one-stage phenol-formaldehyde resin (resole) having a solids content of 80%, 54 pounds of fine (15μ) calcium carbonate, and 14 pounds of water. This adhesive is applied in the same manner as the hide glue except that the preferred temperature of application is about 38° C., this lower temperature is almost necessary to prevent the phenolic resin from curing or gelling too rapidly thereby making it uncoatable; this is then cured to set the phenolic resin.

Discs are cut from this sheet stock of coated abrasive and used on portable grinding tools to effectively and efficiently remove welds, to "clean" metal castings by grinding of fins, flash, riser pads, and the like.

Similarly, coated abrasive belts employing cloth or paper backings and waterproof or non-waterproof making and sizing coats made with the novel abrasive of this invention are particularly useful for heavy duty grinding of metals. For such coated abrasive applications elongated grains are desirable and may be obtained by roll crushing techniques well known in the art. For such grains, the method of U.S. Patent 2,970,929 may be employed.

What is claimed is:

1. A fused crystalline particulate abrasive material, said material consisting essentially of 20–65% by weight of zirconium oxide, 15–75% by weight of spinel, 0–65% by weight of non-spinel aluminum oxide, and 0–7% by weight of non-spinel magnesium oxide.

2. The fused crystalline abrasive material of claim 1 wherein the weight ratio of spinel-to-zirconia is about 1:1 and said spinel and zirconia are each present in the amount of 35–55% by weight.

3. A grinding wheel comprised of particulate abrasive, bonding agent and porosity, said abrasive being the fused, crystalline abrasive of claim 1, said bonding agent being selected from the group consisting of vitrified, alkali-metal silicate, and organic resin bonding agents.

4. A grinding wheel comprised of particulate abrasive, bonding agent and porosity, said abrasive being the fused, crystalline abrasive of claim 2, said bonding agent being selected from the group consisting of vitrified, alkali-metal silicate, and organic resin bonding agents.

5. The grinding wheel of claim 4 wherein said bonding agent is a thermoset phenol-formaldehyde condensation resin.

6. A coated abrasive product comprised of a flexible backing and abrasive particles adhesively attached thereto, said abrasive being the zirconia-spinel abrasive of claim 1.

References Cited

UNITED STATES PATENTS

| | | | |
|---|---|---|---|
| 2,409,844 | 10/1946 | Field | 106—57 |
| 2,416,472 | 2/1947 | Field | 106—57 |
| 3,048,493 | 5/1959 | Robie | 51—307 |
| 3,108,886 | 10/1963 | Adamsky | 51—308 |
| 3,224,850 | 12/1965 | Robie | 51—298 |
| 3,437,468 | 4/1969 | Seufert | 51—298 |

FOREIGN PATENTS 611,246  10/1948  Great Britain.

DONALD J. ARNOLD, Primary Examiner

U.S. Cl. X.R.

51—308, 309; 106—57, 62